Jan. 18, 1927.
S. C. ANKER-HOLTH
1,614,588
FISH POSITIONING MACHINE
Original Filed March 7, 1924   2 Sheets-Sheet 1
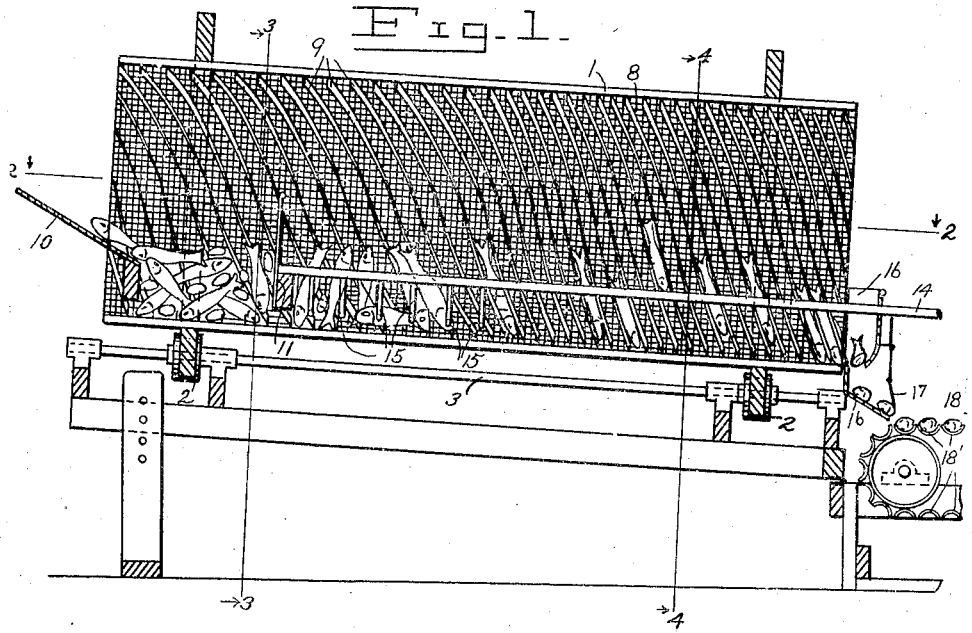
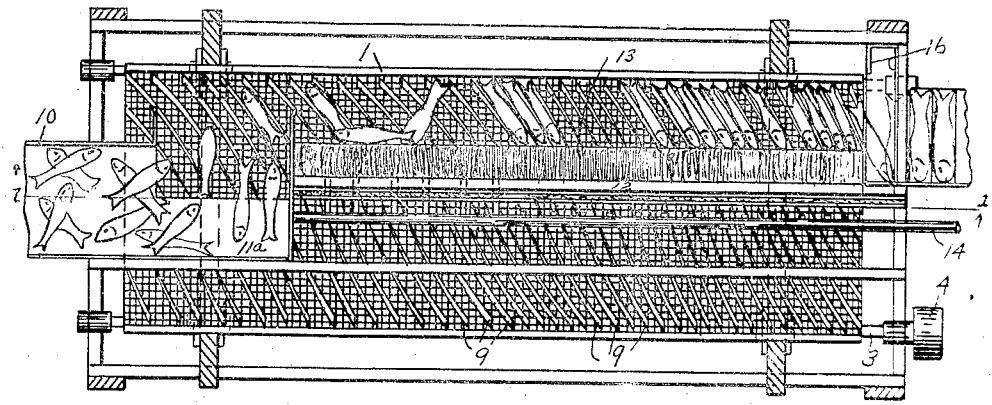
INVENTOR.

Jan. 18, 1927.
S. C. ANKER-HOLTH
1,614,588
FISH POSITIONING MACHINE
Original Filed March 7, 1924    2 Sheets-Sheet 2
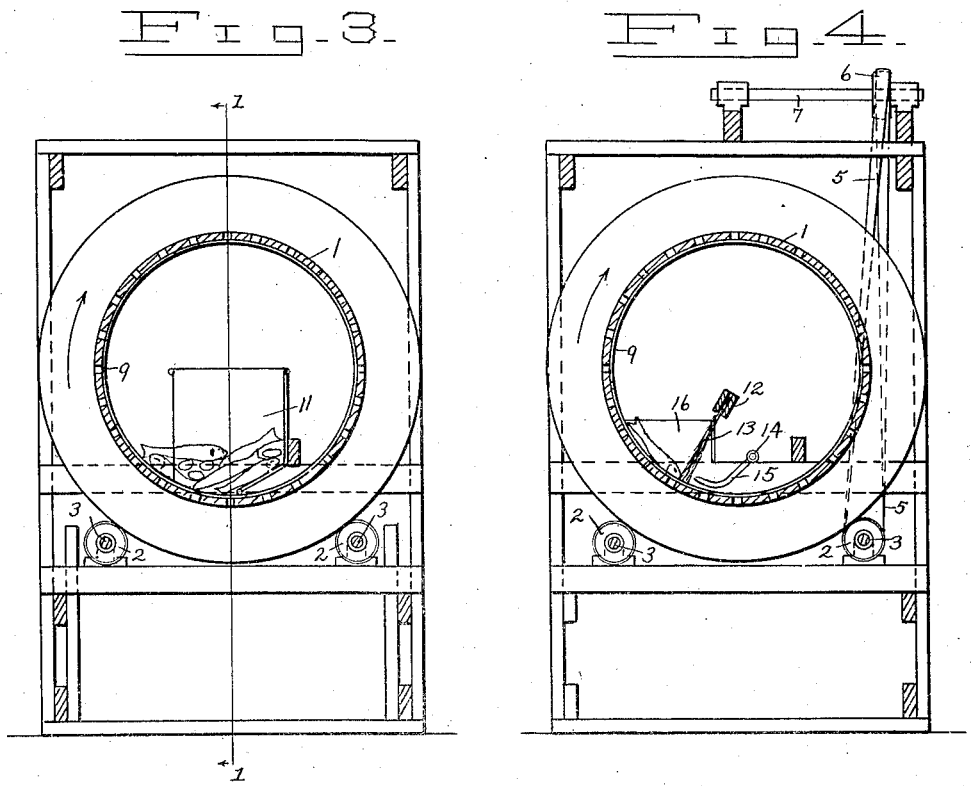

Patented Jan. 18, 1927.

1,614,588

UNITED STATES PATENT OFFICE.

SEVERIN C. ANKER-HOLTH, OF LOS ANGELES, CALIFORNIA.

FISH-POSITIONING MACHINE.

Application filed March 7, 1924, Serial No. 697,439. Renewed June 2, 1926.

My invention relates to machines adapted for use in arranging or positioning fish which are fed to a cleaning machine and must all be delivered to said cleaning machine with their heads in the same direction, a carrier being arranged between the positioning machine to receive the fish one by one in parallel positions and with their heads all in the same direction and to convey said fish in this prearranged condition to the cleaning machine in which they are beheaded and cleaned. A cleaning machine constitutes the invention in my pending application, Serial No. 566,461. In this application I show and describe one practical machine for positioning or arranging the fish in regular and uniform order for delivery to the conveyor, a portion of which is shown.

Among the salient objects of my present invention is to provide a machine to which the fish can be fed in quantity and in which they will be automatically segregated and arranged in order and fed one by one to the conveyor to be delivered to the cleaning machine; to provide a machine having a series of spirally arranged channels into which the fish are shifted as said device is revolved, with means for causing them to be arranged to slide in said channels head first until they are discharged headfirst onto the conveyor.

In order to fully explain the principle of my invention, I have illustrated one embodiment thereof for descriptive purposes on the accompanying sheets of drawings, in which,—

Figure 1 is a vertical sectional view, longitudinally of one form of the invention, on line 1—1 of Fig. 3;

Figure 2 is a horizontal sectional view thereof, taken on line 2—2 of Fig. 1;

Figure 3 is a transverse vertical section thereof taken on line 3—3 of Fig. 1;

Figure 4 is a similar view taken on line 4—4 of Fig. 1.

Referring more in detail to the drawings, I will now describe the embodiment of the invention here illustrated. A revolving cylindrical member 1, open at both ends, is mounted to revolve on rollers, 2, 2, in any suitable manner, said rollers being mounted on shafts, as 3, 3, one of said shafts being provided with a driving pulley, 4, Fig. 2, driven by a belt, 5, from a pulley, 6, on a drive shaft, 7, which may be driven by any desired source of power, such as a motor, not shown. The cylindrical member 1 is covered with a woven wire fabric, or other suitable open material, as 8, and has arranged around its inside and spaced from each other in parallel relationship, a series of spirally disposed angle members, as 9, 9, forming spiral channels or slideways as a fish rests therein. A chute or feed board, 10, is placed in the upper open end of said cylinder and on this the fish are dumped, and slide down into a box-like receptacle, 11, positioned above the bottom of the cylinder at the open end sufficiently for the fish to settle down and slip off the edge of one part of the receptacle, 11ᵃ, as shown in Fig. 2, onto the bottom of the revolving cylinder. Extending longitudinally through the cylinder is a member, 12, from which projects broom straws, 13, said broom straws projecting to the bottom of the cylinder and engaging the spiral members and serving as an abutment for the heads of the fish as they are moved along in the cylinder by the spiral members. The relative position of this member 12 and the broom corn or straws is best seen in Fig. 4, it not being shown in Fig. 1, so as to show a water pipe 14, having a series of discharge nozzles, 15, intended to discharge water in streams and with force sufficient to strike the fish and turn them endwise relative to the stream or jet of water. As the tail end of the fish is lighter, the water naturally throws the tail away and thus said jets of water operate to turn the fish so as to fall into the spiral channels or slideways, with their heads toward the broom straws, as shown in Fig. 2. When the fish are once in one of the channels, being naturally slippery and said channels or slideways being wet, the fish slide toward the discharge end of the cylinder as the same revolves. If the fish is turned with its head in the wrong direction, that is, with its head in the direction of rotation of said cylinder, the fins and scale of the fish catch on the wire fabric and other projections forming the channels or slideways and are carried part way upwardly with the revolving cylinder until they fall back head first, so that before the fish get to the middle of the cylinder, they are rightly positioned with their heads down and each fish being in one of the slideways or channels. At the discharge end of the cylinder, the fish slip out headfirst into a chute, 16, having the suspended, hinged door 17, from which chute 16, said fish slide or roll sidewise on to a conveyor, 18, provided with the individual fish-receiving carriers, 18', as shown in Figs. 1 and 2. Only sufficient of this conveyor is shown to illustrate the manner in which the fish are delivered to said carrier, but as this forms no part of this particular invention, it is not necessary to show more of it.

The cylindrical member or drum, 1, may be of any suitable size, or any suitable material, and mounted in any desired manner so that the fish will be segregated and turned and arranged as they pass from the feed box or receptacle 11, along the inside of the cylinder or drum 1. To this end it is better to mount one end slightly higher than the other so that gravity will assist in feeding the fish from one end of the cylinder to the other.

Thus I have provided a very efficient and practical machine for arranging or positioning fish with their heads all in the same direction as they pass through the machine, and do it automatically, using spiral means for conveying the fish, or guiding them to the place of discharge headfirst, also using water jets to help to turn the fish in the right position, and using the flexible holding means, the broom straw in the machine illustrated, for preventing the fish from being carried upwardly with the cylinder as it turns and then falling back. This holds the fish at the lower side of the cylinder, in the spiral channels, and the spiral nature of said channels cause the fish to slide therein as the cylinder revolves until the fish reaches the end of the cylinder and slides out head first into the chute 16, arranged to receive them and let them pass out sidewise onto the conveyor. I am aware that my invention can be embodied in many different forms of instrumentalities, and that changes can be made herein without departing from the spirit thereof, and I do not, therefore limit the invention to the showing made, except as I may be limited by the hereto appended claims.

I claim:

1. A fish positioning machine including a revoluble cylinder having a plurality of spirally arranged slideways each discharging at the end of said cylinder, whereby fish therein are carried head first in said slideways to the discharge end of said cylinder and means for discharging water jets against the fish to turn them into said slideways.

2. A fish positioning machine including a revoluble cylinder having spirally arranged slideways therein, means for discharging water jets against the fish to turn them into said slideways and a holding member in the lower part of said cylinder extending longitudinally thereof, for the purpose referred to.

3. A fish positioning machine including a revoluble cylindrical member with a covering of wire fabric and a series of spirally arranged members therein forming spiral channels or slideways, means therein for feeding fish to said slideways, means for holding the fish from rising on one side of said cylinder and holding them in alinement in the bottom of said cylindrical member, whereby they are fed lengthwise of said cylindrical member as the latter revolves, substantially as described.

4. A fish positioning machine including a cylindrical member having spirally arranged slideways therein leading to its discharge end, means for feeding fish into said member, and means for discharging water jets transversely of the axis of said cylindrical member against the fish to turn them into said slideways.

5. A fish positioning machine including a revoluble cylinder having spirally arranged members therein spaced to form spiral slideways therebetween and leading to the discharge of said cylinder, a flexible element through said cylinder and projecting to the lower side thereof to form an abutment for the fish in said slideways, and a series of water discharge nozzles arranged in said cylinder and positioned to discharge water jets against said fish to turn them into said slideways, substantially as described.

6. A fish positioning machine comprising in combination, a revoluble cylinder having wire fabric in the inside thereof, a series of spirally arranged and spaced members arranged around the inside of said cylinder over said fabric and forming spiral slideways leading to the discharge end of said cylinder, and means within said cylinder for positioning fish in said slideways to slide head first toward the discharge end of the cylinder as said cylinder is revolved.

7. In a machine of the character referred to, in combination, a cylinder revolubly mounted, means therein providing spirally disposed channels forming slideways for individual fish, means for causing the fish to lodge in said slideways with their heads toward the discharge ends of said slideways, and means for holding the fish in sliding position in said slideways as said cylinder revolves.

8. In a machine of the character referred to, in combination, a cylinder revolubly mounted, means therein providing spirally disposed channels forming slideways for fish therein, means for feeding fish into said cylinder, means in said cylinder for positioning said fish in said slideways with their heads in the direction of the discharge end of said slideways, said means including a flexible element projecting toward the lower side of said cylinder and contiguous thereto and means for discharging water jets against said fish to turn said fish into said slideways.

9. In a machine of the character referred to, in combination, a cylinder revolubly mounted and open at both ends to receive and discharge fish, means for feeding fish into one end of said cylinder, means forming spirally arranged individual slideways around the inside of said cylinder leading to the discharge end of said cylinder, means for feeding said fish into said slideways, means for turning them with their heads toward the discharge end of said slideways, whereby they slide head first in said slideways as said cylinder is revolved, means for revolving said cylinder, a discharge chute to receive said fish from said slideways at the discharge end of said cylinder, said discharge chute being adapted to discharge said fish sideways therefrom, substantially as described.

10. A machine of the character described including in combination, a revolubly mounted cylinder open at both ends and lined with woven wire fabric and having arranged therein a series of spaced and spirally positioned members forming slideways to the discharge end of said cylinder, a member extending through said cylinder and having a line of broom straw projecting therefrom to form a flexible holding element wiping the lower side of said cylinder and said slideways, and means for discharging a series of water jets substantially at right angles to the plane of said broom straw and against said fish to position the same, substantially as described.

11. Means for positioning fish including spirally arranged conveying means, means for feeding fish thereto, means for turning said fish with their heads forwardly, and means for holding said fish relative to said conveying means whereby they are fed forwardly head first to the place of discharge.

Signed at Los Angeles, Los Angeles County, California, this 28th day of February, 1924.

SEVERIN C. ANKER-HOLTH.